US011965389B2

(12) United States Patent
Zhu et al.

(10) Patent No.: US 11,965,389 B2
(45) Date of Patent: Apr. 23, 2024

(54) PATCHING CONSTRUCTION METHOD USING A HYDRAULIC VARIABLE-GRADE EXPANSION TOOL FOR BLOCKING DURING DRILLING

(71) Applicant: SOUTHWEST PETROLEUM UNIVERSITY, Chengdu (CN)

(72) Inventors: Xiaohua Zhu, Chengdu (CN); Feilong Cheng, Chengdu (CN); Changshuai Shi, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 84 days.

(21) Appl. No.: 17/956,124

(22) Filed: Sep. 29, 2022

(65) Prior Publication Data

US 2023/0167703 A1 Jun. 1, 2023

(30) Foreign Application Priority Data

Nov. 30, 2021 (CN) .......................... 202111443454.2

(51) Int. Cl.
*E21B 29/08* (2006.01)
*E21B 43/10* (2006.01)

(52) U.S. Cl.
CPC ............ *E21B 29/08* (2013.01); *E21B 43/105* (2013.01)

(58) Field of Classification Search
CPC ........ E21B 29/08; E21B 43/105; E21B 29/10; E21B 43/103; Y02E 10/20
See application file for complete search history.

(56) References Cited

U.S. PATENT DOCUMENTS

| | | | | |
|---|---|---|---|---|
| 5,785,120 A * | 7/1998 | Smalley | .................. | E21B 17/08 166/207 |
| 7,152,679 B2 * | 12/2006 | Simpson | .................. | E21B 29/08 166/55 |
| 8,235,075 B2 * | 8/2012 | Saltel | ...................... | E21B 29/10 166/212 |
| 9,194,201 B2 * | 11/2015 | Simson | .................... | E21B 23/01 |
| 9,347,297 B2 * | 5/2016 | Li | .......................... | E21B 43/105 |
| 10,641,067 B2 * | 5/2020 | Xu | .......................... | E21B 29/10 |

* cited by examiner

*Primary Examiner* — Jonathan Malikasim (57) ABSTRACT

A patching construction method using a hydraulic variable-grade expansion tool for blocking during drilling is provided, which includes a conversion joint, a supporting central pipe, a supporting ring, an expansion pipe, pressure gradient piston subs, double female thread connection subs, T-shaped limiting subs, a tapered centering sub, double male thread central shafts, split supporting subs, an expansion cone, a piston sub with male and female threads, a T-shaped ball compressor, a lower U-shaped pressing sleeve, a ball-seat fixing sleeve, a reciprocating spring, a sealing ball seat, a sealing ball, a tapered guide sub, etc. A patching construction method using a hydraulic variable-grade expansion tool for blocking during drilling, omits the conventional expansion cone sealing manner, and designs a variable pressure gradient expansion tool, so that achieves the objectives of low pressure, large expansion force and reliable sealing, avoids drilling out bottom sealing joint, and reduces the risk of expansion failure.

8 Claims, 5 Drawing Sheets

PATCHING CONSTRUCTION METHOD USING A HYDRAULIC VARIABLE-GRADE EXPANSION TOOL FOR BLOCKING DURING DRILLING

CROSS REFERENCE TO RELATED APPLICATION

This patent application claims the benefit and priority of Chinese Patent Application No. 202111443454.2, entitled "A HYDRAULIC VARIABLE-GRADE EXPANSION TOOL FOR BLOCKING DURING DRILLING AND A PROCESS METHOD USING THE SAME" filed on Nov. 30, 2021, the disclosure of which is incorporated by reference herein in its entirety as part of the present application.

TECHNICAL FIELD

The present disclosure relates to a patching construction method using a hydraulic variable-grade expansion tool for blocking during drilling, which belongs to the technical field of petroleum and natural gas exploration, and particularly relates to a variable pressure gradient expansion tool.

BACKGROUND ART

Petroleum and natural gas resources are the main fossil energy resources in the current world. With the continuous development of human society, the energy resources demand is also increasing. Currently, petroleum and natural gas exploration progresses to the deep strata, and the problems encountered by deep-strata drilling are basically all world-level difficulties. Geological conditions of the deep strata are more complex, such as large pressure gradients, high temperature and high pressure, which causes the leakage more and more frequently during the drilling process. The open-hole plugging technology using the expansion pipe during drilling emerges as the times require. However, due to the rough surface of the formation, the out-of-roundness and the roughness of the inner surface of the drilling hole increase when the expansion pipe is used. On the one hand, the conventional seal using the expansion cone cannot be adopted; on the other hand, the expansion pipe has a relatively small diameter-thickness ratio, in short, the expansion pipe has a relatively large wall thickness and a relatively large expansion force. If a conventional expansion method is used, the internal pressure in the tubular string is relatively large, thereby causing relatively large damage to the ground equipment and the tubular string.

In view of the above problems, the present disclosure provides a patching construction method using a hydraulic variable-grade expansion tool for blocking during drilling. So, the conventional sealing manner using the expansion cone is discarded, and a variable pressure gradient expansion tool is designed, which achieves the objectives of low pressure, large expansion force and reliable sealing, avoids drilling out bottom sealing joint, and reduces the risk of expansion failure.

SUMMARY

The object of the present disclosure is to reduce the expansion pressure of an expansion pipe in an expansion construction process, so as to ensure that the expansion construction of the expansion pipe for blocking open hole during drilling is performed. A variable pressure gradient expansion tool is designed to achieve the objectives of low pressure, large expansion force and reliable sealing, so as to avoid drilling out bottom sealing joint and reduce the risk of expansion failure.

In order to achieve the described object, the technical solution adopted by the present disclosure to solve this problem is: a patching construction method using a hydraulic variable-grade expansion tool for blocking during drilling is provided, the variable-grade expansion tool including a conversion joint (1), a supporting central pipe (2), a supporting ring (3), an expansion pipe (4), pressure gradient piston subs (5), double female thread connection subs (6), T-shaped limiting subs (7), a tapered centering sub (8), double male thread central shafts (9), split supporting subs (10), an expansion cone (11), a piston sub with male and female threads (12), a T-shaped ball compressor (13), a lower U-shaped pressing sleeve (14), a ball-seat fixing sleeve (15), a reciprocating spring (16), a sealing ball seat (17), a sealing ball (18), a tapered guide sub (19), a first O-ring (20), a second O-ring (21), a third O-ring (23), a fourth O-ring (24) and a fifth O-ring (28).

One end of the conversion joint (1) is connected to a tubing string and an other end of the conversion joint (1) is connected to one end of the supporting central pipe (2) via threads, and the first O-ring (20) is provided between the conversion joint (1) and the supporting central pipe (2).

The supporting ring (3) is connected to the supporting central pipe (2) via threads, and is in a clearance fit with the expansion pipe (4).

An other end of the supporting central pipe (2) is connected to one end of one of the double female thread connection subs (6) which is adjacent thereto via threads and sealed with the fourth O-ring 24.

Each of the pressure gradient piston subs (5) is connected to a corresponding one of the T-shaped limiting subs (7) via threads.

The tapered centering sub (8), the expansion cone (11) and the split supporting subs (10) are each in a clearance fit with a corresponding one of the double male thread central shafts (9).

A female thread end of the piston sub with male and female threads (12) is connected to one end of one of the double male thread central shafts (9) which is adjacent thereto via threads, and the fourth O-ring (24) is provided therebetween.

The ball-seat fixing sleeve (15) is connected to a male thread end of the piston sub with male and female threads (12) via threads.

The tapered guide sub (19) is connected to one end of one of the pressure gradient piston subs (5) which is adjacent thereto via threads.

The process method including: connecting the tubing string to the conversion joint (1); placing a variable-grade expansion tool below a well head to an expansion position; securing the tubing string with a slip on ground; pressuring drilling fluid by a pressure pump on the ground, enabling the drilling fluid to reach inner holes of the supporting central pipe (2) and the double male thread central shafts (9) through an inner hole of the tubing string, and enter each of pressure chambers which includes a first pressure chamber (22), a second pressure chamber (25), a third pressure chamber (26) and a fourth pressure chamber (27) through circumferential holes of a corresponding one of the double male thread central shafts (9), enabling the drilling fluid which with high pressure to push each of the pressure gradient piston subs (5) to move upward axially, and driving the expansion cone (11) to expand the expansion pipe (4).

When moving the pressure gradient piston subs (5) upwards for one stroke, pushing the upper sealing ball (18) up by the tapered guide sub (19), driving the T-shaped ball compressor (13) by the sealing ball (18) to compress the reciprocating spring (16), enabling high pressure fluid in the variable-grade expansion tool to flow out through the inner hole of the tapered guide sub (19), and enabling the internal pressure of the variable-grade expansion tool to decrease sharply.

Turning off the pressure pump on the ground immediately when the internal pressure of the variable-grade expansion tool decreases sharply, and indicating that the pressure gradient piston subs (5) completes one stroke at this moment. Releasing the slip at the well head at this time, lifting the tubing string for one stroke, and enabling the tapered guide sub (19) to be separated from the sealing ball (18), releasing the reciprocating spring (16), and pressing the sealing ball (18) downwards by the T-shaped ball compressor (13), achieving a seal by matching the sealing ball (18) with the sealing ball seat (17) again, then fixing the tubing string at the well head, and turning on the pressure pump.

Repeating above-mentioned operations until completing a expansion operation.

enabling positions of the tapered centering sub (8), the split supporting subs (10) and the expansion cone (11) to be exchanged so as to realize a front placement, a middle placement or a rear placement of the variable-grade expansion tool.

Arranging the positions in such a first order of the expansion cone (11), the tapered centering sub (8) and the split supporting subs (10), so as to form the rear placement of the variable-grade expansion tool and to be suitable for a straight well section.

Arranging the positions in such a second order of the tapered centering sub (8), the expansion cone (11) and the split supporting subs (10), so as to from the middle placement of the variable-grade expansion tool and to be suitable for a straight well section and an oil and gas well with a hole angle of less than 55 degrees.

Arranging the positions in such a third order of the tapered centering sub (8), the split supporting subs (10) and the expansion cone (11), so as to form the front placement of the variable-grade expansion tool and to be suitable for a horizontal well section and an oil and gas well with a hole angle greater than 55 degrees.

Providing each of the T-shaped limit subs (7) with 1-2 small holes circumferentially to facilitate installation.

Providing four of the pressure gradient piston subs (5) to eight of the pressure gradient piston subs (5); enabling a number of the pressure gradient piston stubs (5) to correspond to a number of the pressure chambers.

Terminating a first stroke with 500-700 mm, after pushing the upper sealing ball (18) up by the tapered guide sub (19), compressing the reciprocating spring (16) and enabling the internal pressure of the variable-grade expansion tool to decrease sharply.

Separating the tapered guide sub (19) from the sealing ball (18) after lifting the tubing string for one stroke; pressing the sealing ball (18) downwards by the T-shaped ball compressor (13) and achieving the seal by matching the sealing ball (18) with the sealing ball seat (17) again under an action of the reciprocating spring (16).

Guiding the variable-grade expansion tool to be lowered correctly and smoothly by the tapered guide sub (19) with a tapered angle ranging from 15 to 45 degrees during lowering the variable-grade expansion tool.

Enabling the positions of the tapered centering sub (8), the split supporting subs (10) and the expansion cone (11) to be exchanged.

Enabling the patching construction of the open hole and the casing damage well includes a process of hanging a tail pipe for the open hole, blocking the open hole, and patching the casing damage.

It can be seen from the technical solution provided by the present disclosure that, compared with the prior art, the present disclosure provides a variable pressure gradient expansion tool, which can automatically control the wellhead pressure to achieve the objectives of low pressure, large expansion force and reliable sealing, can avoid drilling out bottom sealing joint and can reduce the risk of expansion failure.

1 conversion joint, 2 supporting central pipe, 3 supporting ring, 4 expansion pipe, 5 pressure gradient piston subs, 6 double female thread connection subs, 7 T-shaped limiting sub, 8 tapered centering sub, 9 double male thread central shafts, 10 split supporting sub, 11 expansion cone, 12 a piston sub with male and female threads, 13 T-shaped ball compressor, 14 lower U-shaped pressing sleeve, 15 ball-seat fixing sleeve, 16 reciprocating spring, 17 sealing ball seat, 18 sealing ball, 19 tapered guide sub, 20 first O-ring, 21 second O-ring, 22 first pressure chamber, 23 third O-ring, 24 fourth O-ring, 25 second pressure chamber, 26 third pressure chamber, 27 fourth pressure chamber, 28 fifth O-ring.

DETAILED DESCRIPTION OF THE EMBODIMENTS

In order to clearly understand the technical features, objectives, and effects of the present disclosure, specific embodiments of the present disclosure are illustrated with reference to the accompanying drawings.

The specific embodiments of the present disclosure described herein are only for the purpose of explaining the present disclosure, and cannot be construed as limiting the present disclosure in any way. With the teaching of the present disclosure, the skilled person can conceive of any possible variations based on the present disclosure, which should be considered as belonging to the scope of the present disclosure. It should be noted that, when an element is referred to as being "disposed on" an other element, the element may be directly on the other element or intervening elements may also be present. When an element is referred to as being "connected" to the other element, it may be directly connected to the other element or intervening elements may be present at the same time. The terms "mount", "communicate", and "connect" should be understood broadly, for example, may be mechanical connection or electrical connection, may also be inner communication of two elements; may be direct connection, and may also be indirect connection through an intermediate medium. A person of ordinary skill in the art may understand the specific meaning of the terms according to specific situations. The terms "vertical", "horizontal", "upper", "lower", "left", "right" and similar expressions as used herein are for illustrative purposes only and are not meant to be the only embodiments.

Unless defined otherwise, all technical and scientific terms used herein have the same meaning as commonly understood by one of ordinary skill in the art to which the present disclosure belongs. The terms used herein in the description of the present disclosure is for the purpose of describing particular embodiments only and is not intended to be limiting of the present disclosure. As used herein, the term "and/or" includes any and all combinations of one or more of the related listed items.

The present disclosure will now be described in detail with reference to the accompanying drawings and embodiments.

Figure 1:
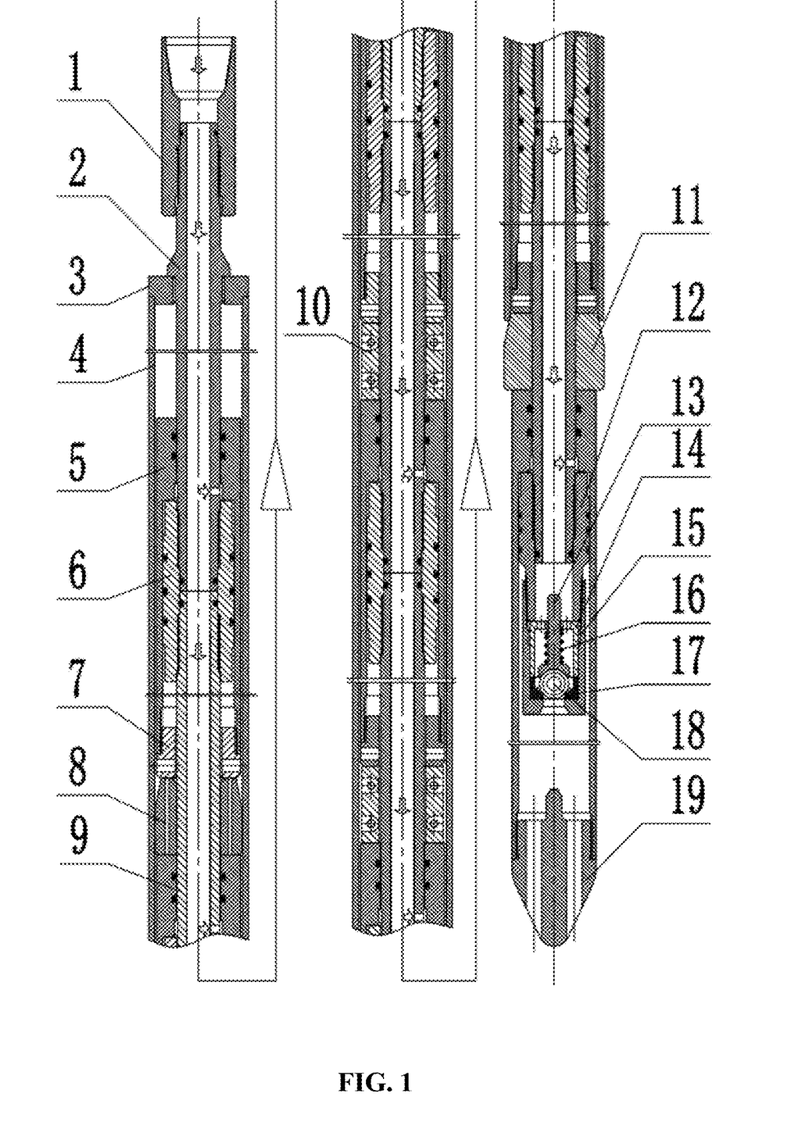
FIG. 1 is a schematic diagram of an initial installation position of a hydraulic variable-grade expansion tool for blocking during drilling according to the embodiments of the present disclosure.

As shown in FIG. 1, in order to achieve the above mentioned objective, the technical solution adopted by the present disclosure for solving this problem is: provide a patching construction method using a hydraulic variable-grade expansion tool for blocking during drilling. The variable-grade expansion tool includes a conversion joint 1, a supporting central pipe 2, a supporting ring 3, an expansion pipe 4, pressure gradient piston subs 5, double female thread connection subs 6, T-shaped limiting subs 7, a tapered centering sub 8, double male thread central shafts 9, split supporting subs 10, an expansion cone 11, a piston sub with male and female threads 12, a T-shaped ball compressor 13, a lower U-shaped pressing sleeve 14, a ball-seat fixing sleeve 15, a reciprocating spring 16, a sealing ball seat 17, a sealing ball 18, a tapered guide sub 19, an first O-ring 20, an second O-ring 21, an third O-ring 23, an fourth O-ring 24 and an fifth O-ring 28.

As shown in FIG. 1, a patching construction method using a hydraulic variable-grade expansion tool for blocking during drilling is provided. One end of the conversion joint 1 is connected to a tubing string and an other end of the conversion joint 1 is connected to one end of the supporting central pipe 2 via threads. The first O-ring 20 is provided between the conversion joint 1 and the supporting central pipe 2. The supporting ring 3 is connected to the supporting central pipe 2 via threads, and is in a clearance fit with the expansion pipe 4. An other end of the supporting central pipe 2 is connected to one end of one of the double female thread connection subs 6 which is adjacent to the supporting central pipe 2 via threads and sealed with the fourth O-ring 24. Each of the pressure gradient piston subs 5 is connected to a corresponding one of the T-shaped limiting subs 7 via threads. The tapered centering sub 8, the expansion cone 11 and the split supporting subs 10 are each in a clearance fit with a corresponding one of the double male thread central shafts 9. The female thread end of the piston sub with male and female threads 12 is connected to one end of one of the double male thread central shafts 9 which is adjacent to the piston sub with male and female threads 12 via threads, and the fourth O-ring 24 is provided therebetween. The ball-seat fixing sleeve 15 is connected to the male thread end of the piston sub with male and female threads 12 via threads. And the tapered guide sub 19 is connected to one end of one of the pressure gradient piston subs 5 which is adjacent to the tapered guide sub 19 via threads.

As shown in FIG. 1, the tubing string is connected to the conversion joint 1, and a variable-grade expansion tool is placed below a well head to an expansion position, and the tubing string is secured with a slip on the ground. Drilling fluid reaches inner holes of the supporting central pipe 2 and the double male thread central shafts 9 through an inner hole of the tubing string, by means of a pressure applied by a pressure pump on the ground, and enters each of pressure chambers which includes a first pressure chamber 22, a second pressure chamber 25, a third pressure chamber 26 and a fourth pressure chamber 27 through circumferential holes of a corresponding one of the double male thread central shafts 9. Each of the pressure gradient piston subs 5 is pushed to move upward axially by the drilling fluid which with high-pressure, and the expansion cone 11 is driven to expand the expansion pipe 4.

Figure 2:
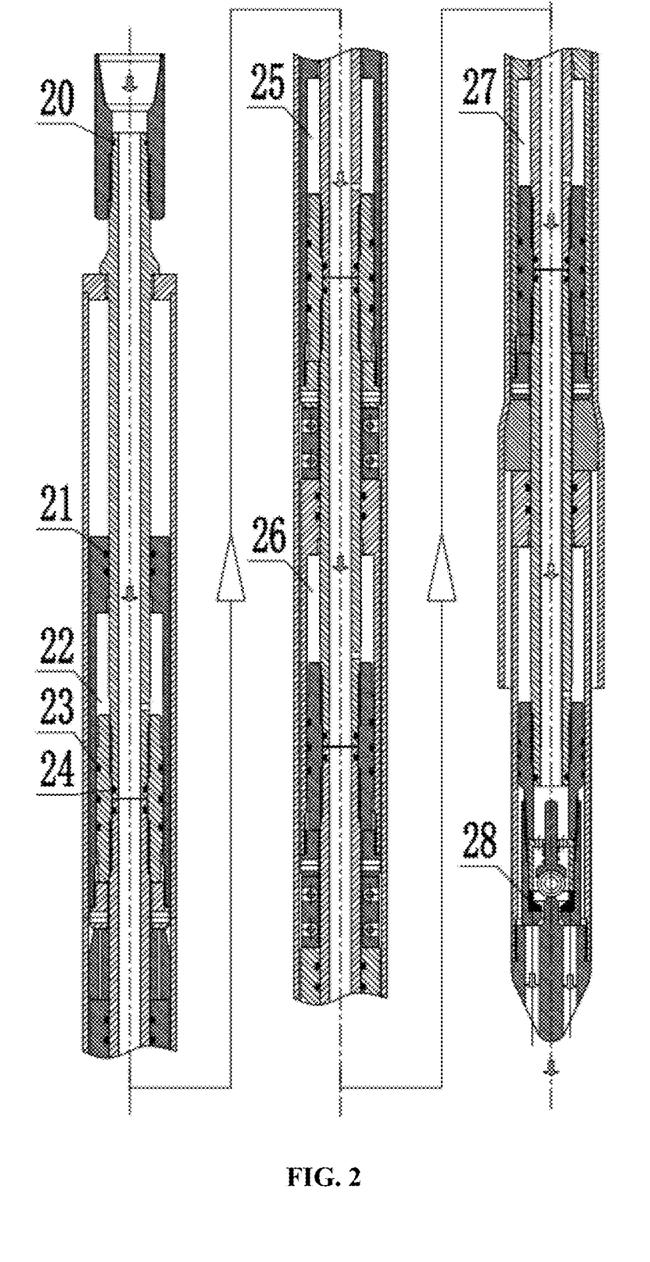
FIG. 2 is a schematic diagram after completing one stroke according to the embodiments of the present disclosure.

As shown in FIG. 2, when the pressure gradient piston subs 5 move upwards for one stroke, the upper sealing ball 18 is pushed up by the tapered guide sub 19, and the T-shaped ball compressor 13 is driven by the sealing ball 18 to compress the reciprocating spring 16. Then high pressure fluid in the variable-grade expansion tool flows out through the inner hole of the tapered guide sub 19, and the internal pressure of the variable-grade expansion tool decreases sharply.

As shown in FIGS. 1-2, when the internal pressure of the variable-grade expansion tool decreases sharply, the pressure pump on the ground is turned off immediately, and at this moment, it indicates that the pressure gradient piston subs 5 completes one stroke. At this time, the slip at the well head is released, the tubing string is lifted for one stroke, and the tapered guide sub 19 is separated from the sealing ball 18, so that the reciprocating spring 16 is released and the sealing ball 18 is pressed downwards by the T-shaped ball compressor 13. A seal by matching the sealing ball 18 with the sealing ball seat 17 is achieved, then the tubing string at the well head is fixed, and the pressure pump is turned on again.

The above-mentioned operations are repeated until the expansion operation of the expansion pipe is fully completed.

Positions of the tapered centering sub 8, the split supporting subs 10 and the expansion cone 11 can be exchanged, so as to realize a front placement, a middle placement or a rear placement of the variable-grade expansion tool. The front placement, the middle placement and the rear placement of the variable-grade expansion tool are determined according to the position of the expansion cone 11 in the variable-stage expansion tool. If most of the parts of the variable-grade expansion tool are above the expansion cone 11, it is the front placement of the variable-grade expansion tool. For example, in FIG. 1, most of the parts in the entire variable-grade expansion tool are above the expansion cone 11, and the expansion cone 11 is located at the rear of the entire variable-grade expansion tool. This installation is the front placement of the variable-grade expansion tool.

The positions in such a first order of the expansion cone 11, the tapered centering sub 8 and the split supporting subs 10 is arranged, so as to form the rear placement of the variable-grade expansion tool and to be suitable for a straight well section.

The positions in such a second order of the tapered centering sub 8, the expansion cone 11 and the split supporting subs 10 is arranged, so as to from the middle placement of the variable-grade expansion tool and to be suitable for a straight well section and an oil and gas well with a hole angle of less than 55 degrees.

The positions in such a third order of the tapered centering sub 8, the split supporting subs 10 and the expansion cone 11 is arranged, so as to from front placement of the variable-grade expansion tool and to be suitable for a horizontal well section and an oil and gas well with a hole angle greater than 55 degrees.

Each of the T-shaped limit subs 7 is provided with 1-2 small holes circumferentially to facilitate installation.

The number of the pressure gradient piston subs 5 is not limited, and four of the pressure gradient piston subs 5 to eight of the pressure gradient piston subs 5 are generally provided. A number of the pressure gradient piston subs 5 determines a number of the pressure chambers.

When the upper sealing ball 18 is pushed up by the tapered guide sub 19, the reciprocating spring 16 is compressed and the internal pressure of the variable-grade expansion tool decreases sharply, the first stroke terminates, and the stroke is 500-700 mm.

After the tubing string is lifted for one stroke, the tapered guide sub 19 is separated from the sealing ball 18. Under the action of the reciprocating spring 16, the sealing ball 18 is pressed downwards by the T-shaped ball compressor 13, and the seal by matching the sealing ball (18) with the sealing ball seat (17) is achieved again.

The tapered guide sub 19 guides the variable-grade expansion tool to be lowered correctly and smoothly during lowering process of variable-grade expansion tool, with the tapered angle ranging from 15 to 45 degrees.

Figure 3:
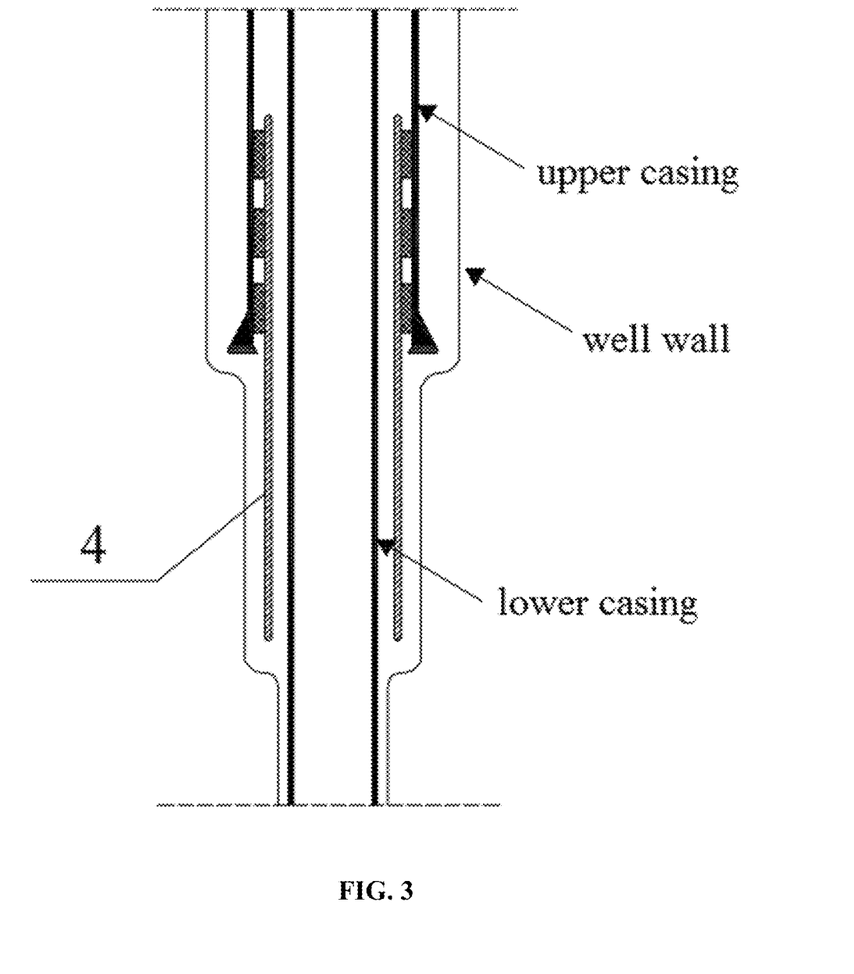
FIG. 3 is a schematic diagram of a process of hanging a tail pipe of an expansion pipe for an open hole according to the embodiments of the present disclosure.
Figure 4:
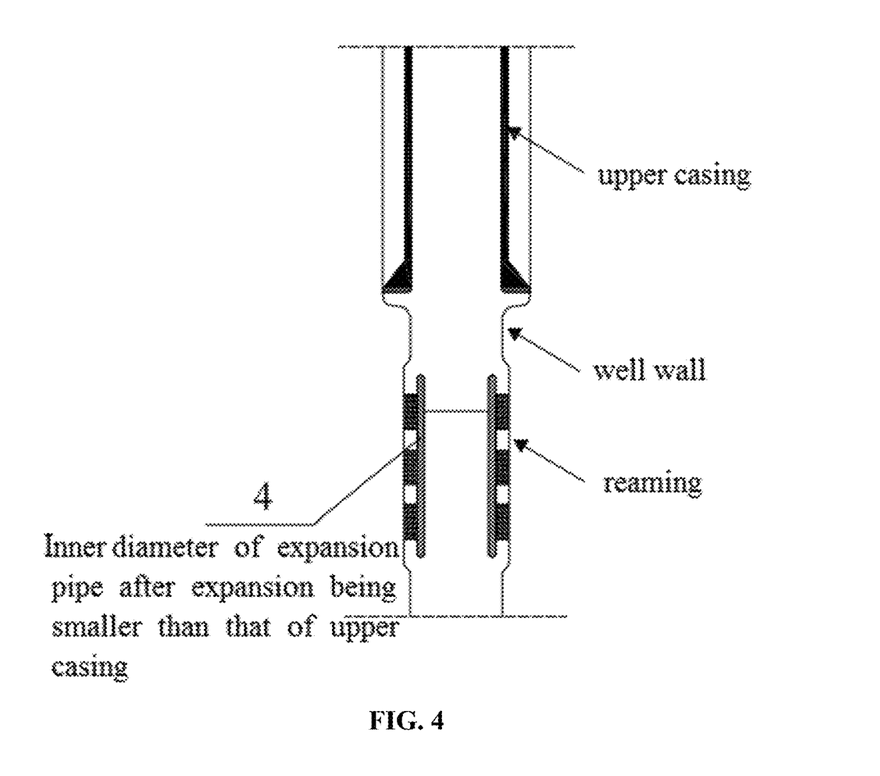
FIG. 4 is a schematic diagram of a patching process using expansion pipe for an open hole according to embodiments of the present disclosure.
Figure 5:
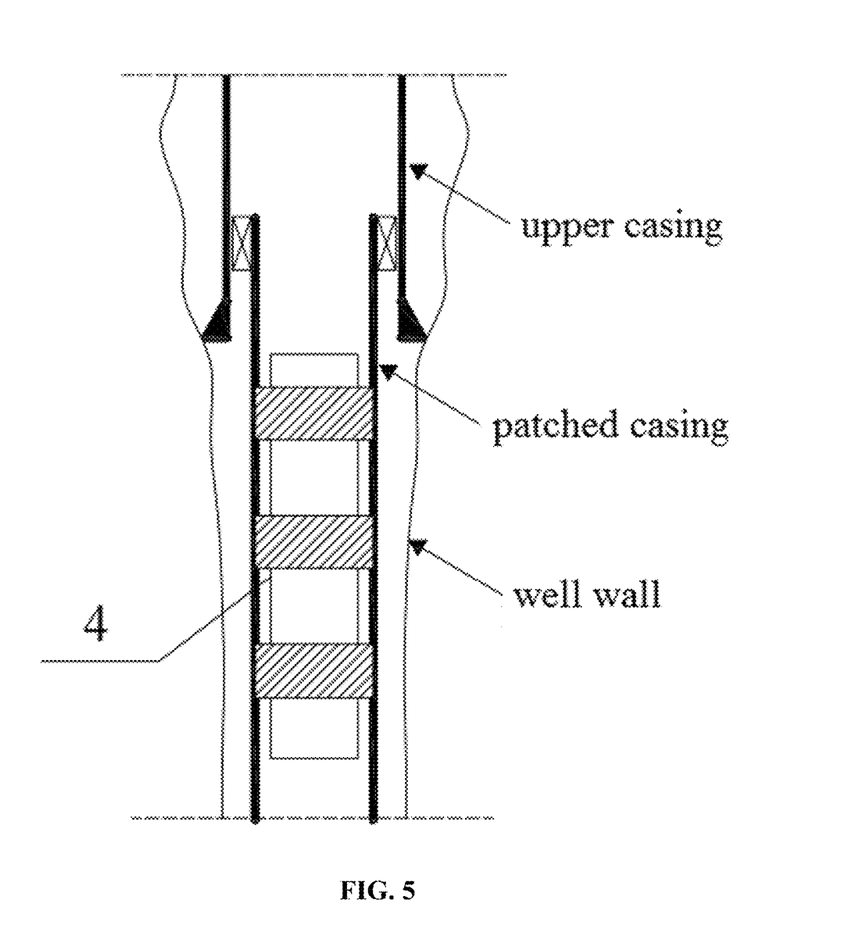
FIG. 5 is a schematic diagram of a patching process for a casing damage well according to embodiments of the present disclosure.

As shown in FIGS. 3-5, the method can be used for the patching construction of the open hole and the casing damage well includes a process of hanging a tail pipe for the open hole, blocking the open hole, and patching the casing damage.

The foregoing descriptions are merely preferred embodiments of the present disclosure, and are not intended to limit the spirit and principle of the present disclosure. Any modification, equivalent replacement, and improvement made without departing from the spirit and principle of the present disclosure shall belong to the scope of the present disclosure.

What is claimed is:

1. A patching construction method using a hydraulic variable-grade expansion tool for blocking during drilling, the variable-grade expansion tool comprising a conversion joint (1), a supporting central pipe (2), a supporting ring (3), an expansion pipe (4), pressure gradient piston subs (5), double female thread connection subs (6), T-shaped limiting subs (7), a tapered centering sub (8), double male thread central shafts (9), split supporting subs (10), an expansion cone (11), a piston sub with male and female threads (12), a T-shaped ball compressor (13), a lower U-shaped pressing sleeve (14), a ball-seat fixing sleeve (15), a reciprocating spring (16), a sealing ball seat (17), a sealing ball (18), a tapered guide sub (19), a first O-ring (20), a second O-ring (21), a third O-ring (23), a fourth O-ring (24) and a fifth O-ring (28); wherein one end of the conversion joint (1) is connected to a tubing string and an other end of the conversion joint (1) is connected to one end of the supporting central pipe (2) via threads, and the first O-ring (20) is provided between the conversion joint (1) and the supporting central pipe (2); the supporting ring (3) is connected to the supporting central pipe (2) via threads, and is in a clearance fit with the expansion pipe (4); an other end of the supporting central pipe (2) is connected to one end of one of the double female thread connection subs (6) which is adjacent thereto via threads; each of the pressure gradient piston subs (5) is connected to a corresponding one of the T-shaped limiting subs (7) via threads; the tapered centering sub (8), the expansion cone (11) and the split supporting subs (10) are each in a clearance fit with a corresponding one of the double male thread central shafts (9); a female thread end of the piston sub with male and female threads (12) is connected to one end of one of the double male thread central shafts (9) which is adjacent thereto via threads, and the fourth O-ring (24) is provided therebetween; the ball-seat fixing sleeve (15) is connected to a male thread end of the piston sub with male and female threads (12) via threads; and the tapered guide sub (19) is connected to one end of one of the pressure gradient piston subs (5) which is adjacent thereto via threads;

wherein the method comprises:
connecting the conversion joint (1) to the tubing string placing the variable-grade expansion tool to an expansion position; securing the tubing string on ground; pressuring drilling fluid by a pressure pump on the ground, enabling the drilling fluid to reach inner holes of the supporting central pipe (2) and the double male thread central shafts (9) through an inner hole of the tubing string, and enter each of pressure chambers which comprises a first pressure chamber (22), a second pressure chamber (25), a third pressure chamber (26) and a fourth pressure chamber (27) through circumferential holes of a corresponding one of the double male thread central shafts (9), enabling the drilling fluid with high pressure to push each of the pressure gradient piston subs (5) to move axially, and driving the expansion cone (11) to expand the expansion pipe (4); pushing the upper sealing ball (18) up by the tapered guide sub (19), compressing the reciprocating spring (16), enabling the internal pressure of the variable-grade expansion tool to decrease sharply; turning off the pressure pump on the ground, lifting the tubing string for one stroke, enabling the reciprocating spring (16) to be released, and pressing the sealing ball (18) downwards by the T-shaped ball compressor (13), achieving a seal by matching the sealing ball (18) with the sealing ball seat (17); repeating above-mentioned operations until completing a expansion operation;
enabling positions of the tapered centering sub (8), the split supporting subs (10) and the expansion cone (11) to be exchanged so as to realize a front placement, a middle placement or a rear placement of the variable-grade expansion tool; and enabling a patching construction of an open hole and a casing damage well.

2. The patching construction method using a hydraulic variable-grade expansion tool for blocking during drilling according to claim 1, wherein the method comprises providing each of the T-shaped limit subs (7) with 1-2 small holes circumferentially to facilitate installation.

3. The patching construction method using a hydraulic variable-grade expansion tool for blocking during drilling according to claim 1, wherein the method comprises providing four of the pressure gradient piston subs (5) to eight of the pressure gradient piston subs (5); enabling a number of the pressure gradient piston stubs (5) to correspond to a number of the pressure chambers.

4. The patching construction method using a hydraulic variable-grade expansion tool for blocking during drilling according to claim 1, wherein the method comprises terminating a first stroke with 500-700 mm, after pushing the upper sealing ball (18) up by the tapered guide sub (19), compressing the reciprocating spring (16) and enabling the internal pressure of the variable-grade expansion tool to decrease sharply.

5. The patching construction method using a hydraulic variable-grade expansion tool for blocking during drilling according to claim 1, wherein the method comprises separating the tapered guide sub (19) from the sealing ball (18) after lifting the tubing string for one stroke; pressing the sealing ball (18) downwards by the T-shaped ball compressor (13) and achieving the seal by matching the sealing ball (18) with the sealing ball seat (17) again under an action of the reciprocating spring (16).

6. The patching construction method using a hydraulic variable-grade expansion tool for blocking during drilling according to claim 1, wherein the method comprises guiding the variable-grade expansion tool to be lowered correctly and smoothly by the tapered guide sub (19) with a tapered angle ranging from 15 to 45 degrees during lowering the variable-grade expansion tool.

7. The patching construction method using a hydraulic variable-grade expansion tool for blocking during drilling according to claim 1, wherein enabling the positions of the tapered centering sub (8), the split supporting subs (10) and the expansion cone (11) to be exchanged comprises:

arranging the positions in such a first order of the expansion cone (11), the tapered centering sub (8) and the split supporting subs (10), so as to form the rear placement of the variable-grade expansion tool and to be suitable for a straight well section;

arranging the positions in such a second order of the tapered centering sub (8), the expansion cone (11) and the split supporting subs (10), so as to from the middle placement of the variable-grade expansion tool and to be suitable for a straight well section and an oil and gas well with a hole angle of less than 55 degrees; and arranging the positions in such a third order of the tapered centering sub (8), the split supporting subs (10) and the expansion cone (11), so as to form the front placement of the variable-grade expansion tool and to be suitable for a horizontal well section and an oil and gas well with a hole angle greater than 55 degrees.

8. The patching construction method using a hydraulic variable-grade expansion tool for blocking during according to claim 1, wherein enabling the patching construction of the open hole and the casing damage well comprises a process of hanging a tail pipe for the open hole, blocking the open hole, and patching the casing damage.

* * * * *